(12) United States Patent
Barros Neves et al.

(10) Patent No.: US 11,534,048 B2
(45) Date of Patent: Dec. 27, 2022

(54) METHOD OF CONTROLLING OPERATION OF A WASHING APPLIANCE

(71) Applicant: ELECTROLUX APPLIANCES AKTIEBOLAG, Stockholm (SE)

(72) Inventors: Alexandre Barros Neves, Stockholm (SE); Anne-Kathrine Nissen, Stockholm (SE); Luis Michio Kobayashi, Stockholm (SE)

(73) Assignee: Electrolux Appliances Aktiebolag

( * ) Notice: Subject to any disclaimer, the term of this patent is extended or adjusted under 35 U.S.C. 154(b) by 225 days.

(21) Appl. No.: 16/767,761

(22) PCT Filed: Nov. 30, 2017

(86) PCT No.: PCT/EP2017/080912
§ 371 (c)(1),
(2) Date: May 28, 2020

(87) PCT Pub. No.: WO2019/105549
PCT Pub. Date: Jun. 6, 2019

(65) Prior Publication Data
US 2020/0288938 A1 Sep. 17, 2020

(51) Int. Cl.
*A47L 15/00* (2006.01)
*A47L 15/42* (2006.01)
(Continued)

(52) U.S. Cl.
CPC ....... *A47L 15/4293* (2013.01); *A47L 15/0044* (2013.01); *A47L 15/0047* (2013.01);
(Continued)

(58) Field of Classification Search
CPC ............. A47L 15/0047; A47L 15/4293; A47L 15/0044; A47L 2501/30; A47L 2301/08;
(Continued)

(56) References Cited

U.S. PATENT DOCUMENTS 8,976,126 B2 * 3/2015 Kim .................. D06F 33/46
68/3 R
10,106,924 B2 * 10/2018 Cruickshank ....... G06F 3/04847
(Continued)

FOREIGN PATENT DOCUMENTS

DE 102015220282 A1 4/2017
WO WO 2006/087735 A1 8/2006

OTHER PUBLICATIONS

International Search Report and Written Opinion for Application No. PCT/EP2017/080912 dated Jul. 26, 2018, 11 pages.
(Continued)

*Primary Examiner* — Benjamin L Osterhout
(74) *Attorney, Agent, or Firm* — RatnerPrestia

(57) ABSTRACT

Provided herein are a method of controlling operation of a washing appliance and a washing appliance being controlled by the method. The method may include displaying, on a user interface of the washing appliance, an estimated duration of a selected washing program for the washing appliance; displaying, on the user interface, a degree of ecological impact caused by the selected washing program; allowing a user to operate the user interface to change the duration of the selected washing program, wherein the washing appliance adapts the selected cleaning program to comply with the changed duration; and displaying on the user interface the degree of ecological impact caused by the selected washing program when complying with the changed duration.

13 Claims, 4 Drawing Sheets

(51) Int. Cl.
*D06F 33/44* (2020.01)
*D06F 34/28* (2020.01)
*G05B 19/042* (2006.01)
*D06F 101/14* (2020.01)
*D06F 34/32* (2020.01)

(52) U.S. Cl.
CPC ........... *D06F 33/44* (2020.02); *G05B 19/042* (2013.01); *A47L 2301/08* (2013.01); *A47L 2501/30* (2013.01); *D06F 34/32* (2020.02); *D06F 2101/14* (2020.02); *G05B 2219/2633* (2013.01)

(58) Field of Classification Search
CPC .......... G05B 19/042; G05B 2219/2633; D06F 33/44; D06F 2101/14; D06F 34/32
See application file for complete search history.

(56) References Cited

U.S. PATENT DOCUMENTS

| | | |
|---|---|---|
| 2010/0287711 A1 | 11/2010 | Geyer et al. |
| 2012/0056827 A1 | 3/2012 | Kim et al. |
| 2012/0180227 A1* | 7/2012 | Kim .................... D06F 39/006 8/137 |
| 2016/0312396 A1 | 10/2016 | Cruickshank et al. |
| 2019/0150702 A1 | 5/2019 | Lukschnat et al. |

OTHER PUBLICATIONS

European Communication pursuant to Article 94(3) for European Application No. 17 825 122.9, dated Oct. 21, 2021, 7 pages.

\* cited by examiner

METHOD OF CONTROLLING OPERATION OF A WASHING APPLIANCE

CROSS-REFERENCE TO RELATED APPLICATIONS

This application is a national stage application filed under 35 U.S.C. § 371 of International Application No. PCT/EP2017/080912 filed Nov. 30, 2017, which application is hereby incorporated by reference in its entirety.

TECHNICAL FIELD

The invention relates to a method of controlling operation of a washing appliance, and a washing appliance being controlled by the method.

BACKGROUND

In prior art washing appliances such as e.g. dishwashers and washing machines, a user selects a washing program via a user interface, and is presented to a resource consumption parameter, such as e.g. "time", i.e. estimated duration of the selected washing program.

US 2010/0287711 further discloses that in addition to be presented to the estimated duration of the selected washing program, the user is presented to a performance measure of the selected washing program and is allowed to adjust the performance of the selected washing program. For instance, an intensiveness measure is displayed to the user, wherein the user can increase or decrease the intensiveness of the selected program depending on how soiled the laundry to be washed is.

However, indicating measures associated with performance and resource consumption in absolute terms is a difficult task, since these measures depend on many factors some of which are unknown at the start of a washing program. Further, it is difficult for a user to evaluate these performance and resource consumption measures.

The majority of the users do not know how a washing appliance works and how each adjustable program parameter affects time, performance and consumption.

SUMMARY

An objective of the invention is to solve, or at least mitigate, this problem in the art and to provide an improved method of controlling operation of an appliance for washing and rinsing goods via a user interface.

This objective is attained in a first aspect of the invention by a method of controlling operation of a washing appliance. The method comprises displaying, on a user interface of the washing appliance, an estimated duration of a selected washing program for the washing appliance, and a degree of ecological impact caused by the selected washing program. The method further comprises allowing a user to operate the user interface to change the duration of the selected washing program, wherein the washing appliance adapts the selected cleaning program to comply with the changed duration, and displaying, on the user interface, the degree of ecological impact caused by the selected washing program when complying with the changed duration.

This objective is attained in a second aspect of the invention by a washing appliance being configured to be controlled by a user. The washing compliance comprises a user interface being configured to receive user instructions for controlling operation of the washing appliance, and a processing unit being configured to be communicatively connected to the user interface. The user interface is configured to display an estimated duration of a selected washing program for the washing appliance, display a degree of ecological impact caused by the selected washing program, indicate a level of performance and resource consumption of the selected washing program in relation to a level of performance and resource consumption of a reference washing program, and allow a user to operate the user interface to change the duration of the selected washing program. The processing unit is further configured to adapt the selected cleaning program of the washing appliance to comply with the changed duration. The user interface is further configured to display the degree of ecological impact caused by the adapted selected washing program.

With the invention, when a user selects a washing program, for instance an Eco program causing a low degree of ecological impact, this is displayed to the user e.g. on a user interface with a full ecometer to indicate to the user that an eco-friendly program is selected and the duration of the program is displayed to be relatively long, such as for example 4 hours.

Now, in the invention, the user is allowed to operate the user interface to change the duration of the selected washing program, wherein the washing appliance will adapt the selected cleaning program to comply with the changed duration.

In an embodiment, the user operates the user interface—being e.g a touch-screen interface—by moving a slider in a left-hand direction, having as an effect that the duration decreases from 4 hours to, say, 2.5 hours.

At the same time, the washing appliance adapts to the change in program duration by decreasing the ecometer, thereby indicating that a shorter duration will cause the washing program to have a higher degree of ecological impact, which is displayed to the user.

For instance, in order to achieve the same degree of cleanness as in the washing program having a duration of 4 hours, the washing appliance may have to increase the energy consumption—and thus the water temperature—of the washing appliance in order to adapt to the selected shorter duration of the program.

Advantageously, this provides for clear, straightforward and simplified feedback of the impacts caused by changing the duration of the selected program, on which feedback the user is able to act to further adapt the washing program as desired. As a consequence, the user becomes more confident in adapting a washing program, and misconceptions and/or incorrect assumptions due to a lack of feedback can be avoided.

In an embodiment, the user is allowed to select a pre-set option affecting a setting of the selected washing program, such as "ExtraPower", "ExtraDrying", "Temperature", "Centrifuging", "GlassCare", "HandWash" etc., depending on the particular washing appliance.

In an embodiment, the degree of ecological impact is stipulated by energy and/or water consumption of the washing compliance.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

In prior art washing appliances such as e.g. dishwashers and washing machines, a user selects a washing program via a user interface, and is presented to a resource consumption parameter, such as e.g. "time", i.e. estimated duration of the selected washing program.

US 2010/0287711 further discloses that in addition to be presented to the estimated duration of the selected washing program, the user is presented to a performance measure of the selected washing program and is allowed to adjust the performance of the selected washing program. For instance, an intensiveness measure is displayed to the user, wherein the user can increase or decrease the intensiveness of the selected program depending on how soiled the laundry to be washed is.

However, indicating measures associated with performance and resource consumption in absolute terms is a difficult task, since these measures depend on many factors some of which are unknown at the start of a washing program. Further, it is difficult for a user to evaluate these performance and resource consumption measures.

Figure 1:
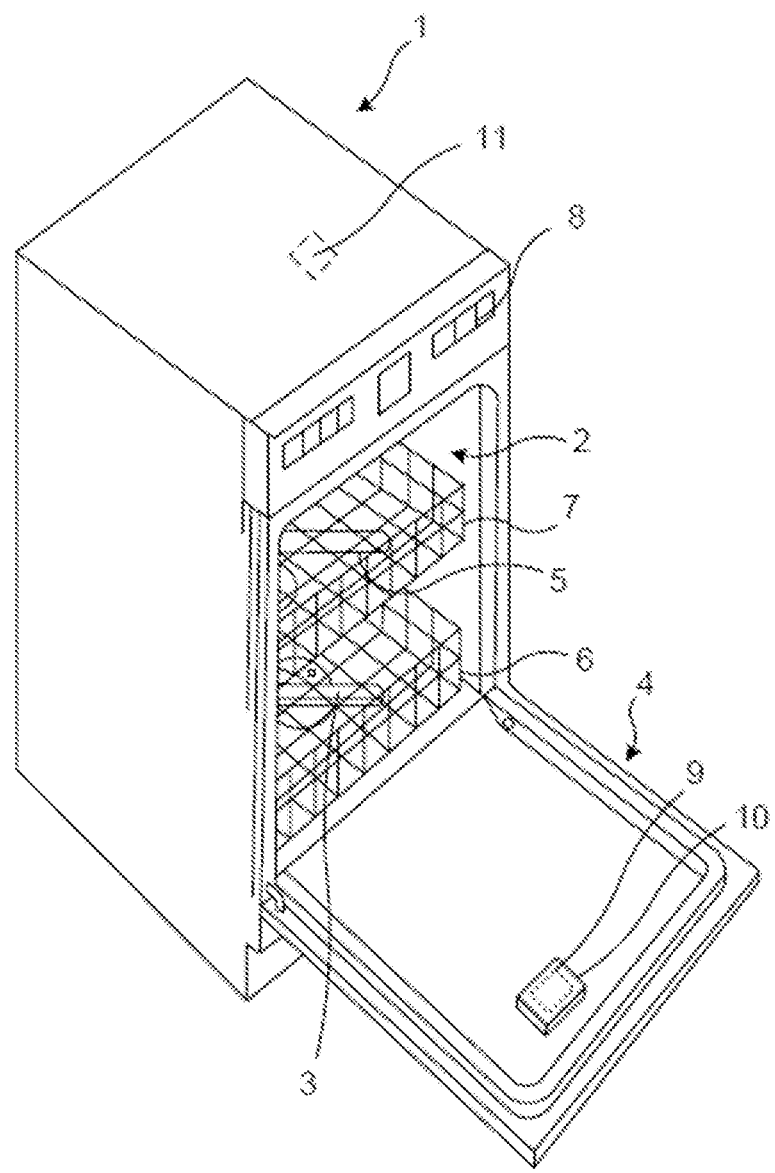
FIG. 1 shows a prior art dishwasher in which the present invention may be implemented.

FIG. 1 shows a prior art appliance for washing and rinsing goods in the form of a dishwasher 1 in which the present invention can be implemented. It should be noted that dishwashers can take on many forms and include many different functionalities. The dishwasher 1 illustrated in FIG. 1 is thus used to explain different embodiments of the present invention and should only be seen as an example of a dishwasher in which the present application can be applied. The present invention may further advantageously be implemented in a washing machine.

The exemplifying dishwasher 1 comprises a washing compartment or tub 2, a door 4 configured to close and seal the washing compartment 2, a spraying system having a lower wash arm 3 and an upper wash arm 5, a lower rack 6 and an upper rack 7. Additionally, it may comprise a specific top rack for cutlery (not shown). A controller 11 such as a microprocessor is arranged in the interior of the dishwasher 1 for controlling washing programmes and is communicatively connected to a user interface 8 via which a user can select washing programmes. The operation of the dishwasher 1 is typically controlled by the controller 11 executing appropriate software stored in a memory.

The door 4 of the prior art dishwasher 1 illustrated in FIG. 1 is further on its inside arranged with a small detergent dispenser 9 having a lid 10 being controllably opened and closed by the controller 11 for dispensing detergent from the dispenser 9 into the washing compartment 2.

FIGS. 2a-2e illustrate a user interface 8 displaying different washing program settings depending on choices made by a user.

Figure 3:
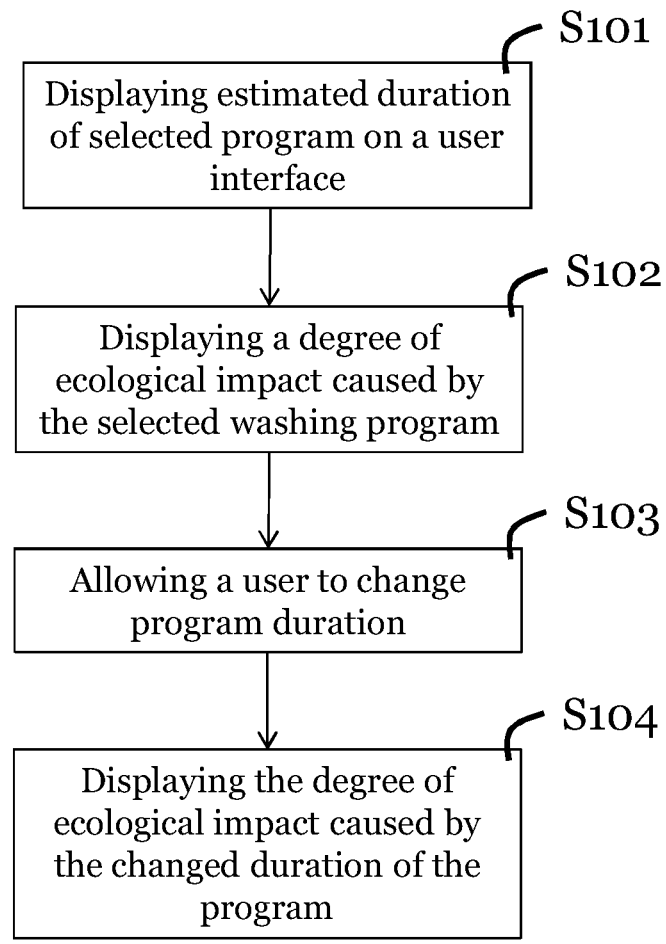
FIG. 3 illustrates a flowchart illustrating a method of controlling operation of a washing appliance according to an embodiment.

Reference will further be made to a flowchart of FIG. 3 illustrating a method of controlling operation of a washing appliance according to an embodiment.

Figure 2:
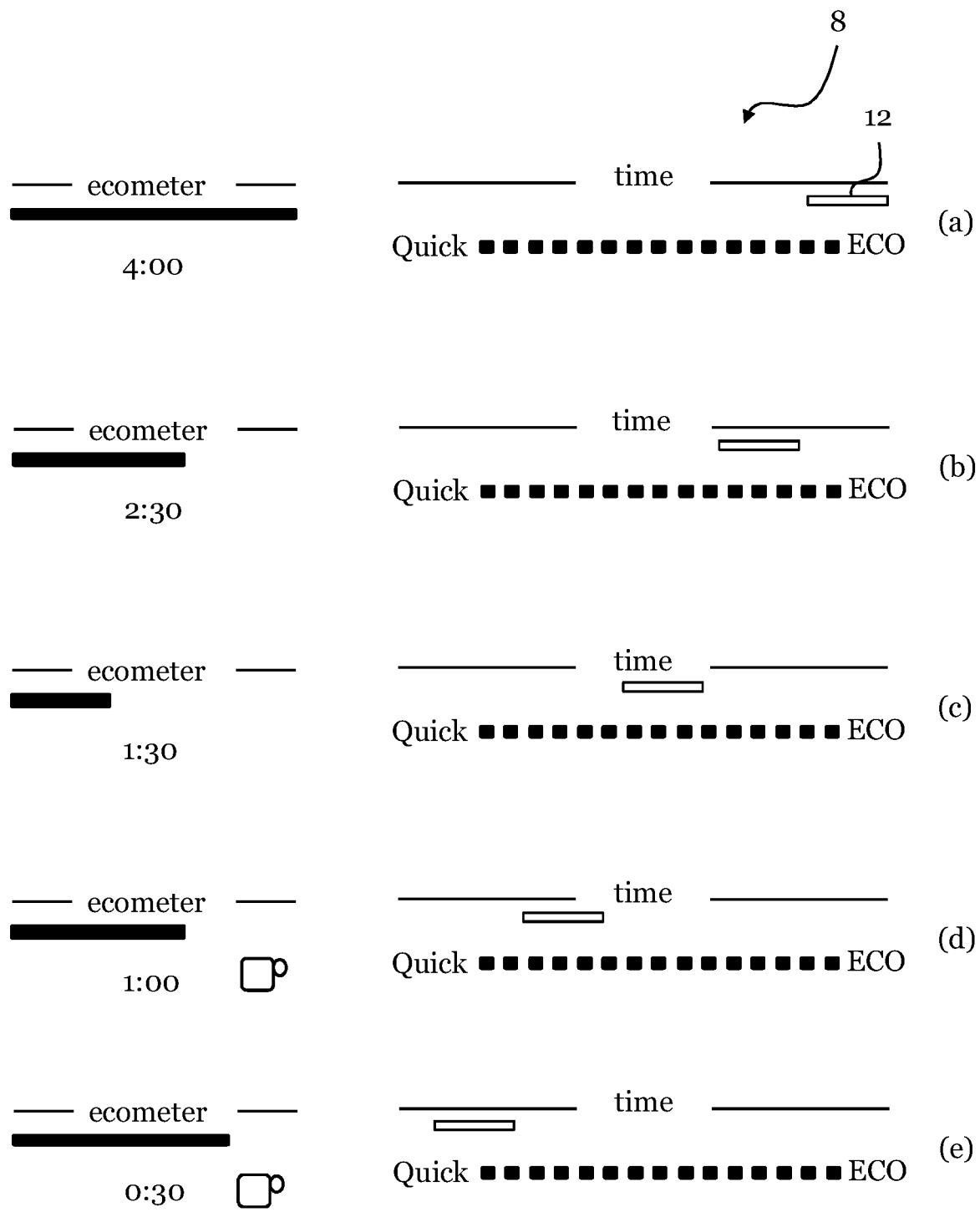
FIGS. 2a-e illustrate user interfaces according to embodiments showing estimated duration of a selected washing program for a washing appliance, and degree of ecological impact caused by the selected washing program.

Starting with FIG. 2a; on a right-hand side of the user interface 8 a time scale ranging from "ECO" (being a lengthy program) to "Quick" (being a short program) is displayed. In this particular exemplifying embodiment, the user interface 8—being a touch-sensitive interface—comprises a slider 12 that the user can operate and thus slide to the right to increase the program duration, or to the left to decrease the program duration.

It is noted that the user interface 8 may be a combination of a touch-screen interface and a mechanical interface comprising e.g. press-buttons and revolvable knobs operated by the user to control operation of the appliance 1.

On a left-hand side of the user interface 8 an ecometer scale is displayed illustrating degree of ecological impact caused by the selected program, where a full bar indicates a lesser degree of ecological impact, while a short bar indicates a higher degree of ecological impact. Typically, the degree of ecological impact is stipulated by energy and/or water consumption of the washing appliance. That is, the higher the energy and/or water consumption, the greater the ecological impact.

As is shown in FIG. 2a, when a user selects a washing program, for instance an Eco program causing a low degree of ecological impact, the ecometer is full and the duration of the program is long, in this example 4 hours.

Thus, with reference to FIG. 3, an estimated duration—4 hours—of a selected washing program is displayed on the user interface 8 in step S101.

Further, a degree of ecological impact—in the form of a full ecometer bar—caused by the selected washing program is displayed in step S102.

Now, in the invention, the user is allowed to operate the user interface 8 to change the duration of the selected washing program in step S103, wherein the washing appliance will adapt the selected cleaning program to comply with the changed duration.

Hence, as is illustrated in FIG. 2b, the user operates the user interface 8 by moving her finger over the touch-screen interface to move the slider 12 to the left, having as an effect that the duration decreases from 4 hours to 2.5 hours. At the same time, the washing appliance adapts to the change in program duration by decreasing the ecometer, thereby indicating that a shorter duration will cause the washing program to have a higher degree of ecological impact, which is displayed to the user in step S104.

As is understood, the slider on the touch-screen could be arranged to have other shapes and forms, such as a circular shape where the user would operate the slider with a circular motion. Again, a mechanical user interface may be envisaged comprising press-buttons and/or revolvable knobs.

For instance, in order to achieve the same degree of cleanness as in the washing program of FIG. 2a, the washing appliance may have to increase the energy consumption— and thus the water temperature—of the washing appliance in order to adapt to the shorter duration of the program of FIG. 2b.

FIG. 2c shows yet an example where the user moves the slider 12 even further left to decrease the duration of the washing program down to 1.5 hours. Conversely, the ecometer decreases and the degree of environmental impact is even higher.

In yet an embodiment, the user is allowed to select a pre-set option to be added to the washing program.

In yet an embodiment, the user interface 8 is equipped with one or more "Options" icons such as "ExtraPower", "ExtraDrying", "Temperature", "Centrifuging", etc., depending on the particular washing appliance.

Further, options such as "ExtraHygiene" for ensuring bacteria-destroying temperatures for sufficiently long time, or "GlassCare" or "HandWash" for triggering a particularly lenient washing program, or "Pots&Pans" or "Cotton/Wool/Synthetics" for indicating type of goods washed in the appliance, can be envisaged.

FIG. 2d illustrates user-selection of an option referred to as "NoSoil", the option being illustrated by means of a coffee cup.

Upon the user selecting the "NoSoil" option on the user interface 8, the estimated duration of the washing program with the "NoSoil" option added is displayed to be 1 hour, and even though the washing program is estimated to have a shorter duration than the washing program of FIG. 2c, the ecometer increases thereby indicating a lesser ecological impact.

The reason for this is that the "NoSoil" option is selected when less dirty goods are to be washed, such as e.g. glasses or cups, having as an effect that the washing appliance will use colder water (and hence less energy) to perform the washing program.

FIG. 2e further illustrates that the user moves the slider 12 in a left-hand direction with the "NoSoil" option selected, thereby decreasing the program duration to 30 minutes. As can be seen, due to the shorter program duration, the degree of ecological impact may decreases. However, this is likely to be achieved at the expense of a lower level of cleanness as compared to the program selection of FIG. 2d.

Even though FIGS. 2a-e shows illustrate an ever decreasing program duration, it is noted that one or more programs could be selected where duration indeed is increased by the user.

Figure 4:
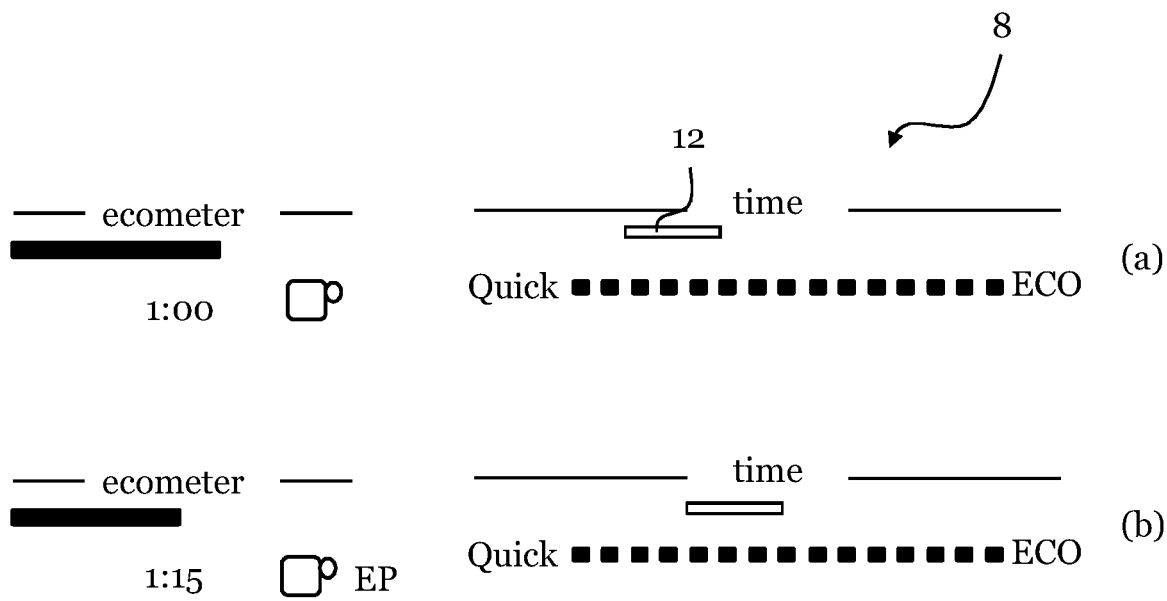
FIGS. 4a-b illustrate user interfaces according to another embodiment.

FIGS. 4a and 4b illustrates an embodiment where still another option is added by the user by operating the user interface 8. In this example, an extra power option denoted "EP" is added.

Assuming that in FIG. 4a, the user has selected the program and option "NoSoil" previously shown in FIG. 2d, and further selects the "EP" option on the user interface 8 in FIG. 4b.

This has as an effect that another 15 minutes is added to the program, and since more energy is consumed by the washing appliance, and the ecological impact is greater.

In an embodiment, it is envisaged that the user controls the washing appliance with a wireless communication device such as a smart phone, a tablet, a smart watch, etc. (possibly via an appropriate Application installed on the wireless communication device). Preferably, the wireless communication device is capable of mirroring all or parts of the user interface 8 of the washing appliance on its screen to the user (or at least a representation of the user interface). The user may thus enter any data, which she normally enters via the user interface 8 on the washing appliance 1, on the wireless communication device and send the data to the washing appliance 1 from a remote location.

The washing appliance may be communicatively connected to the wireless communication device via e.g. a wireless telephone network, WiFi or Bluetooth.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of controlling operation of a washing appliance, comprising:
   displaying, on a user interface of the washing appliance, an estimated duration of a selected washing program for the washing appliance;
   displaying, on the user interface, separately from the displayed estimated duration of the selected washing program, a degree of ecological impact caused by the selected washing program, wherein the degree of ecological impact indicates a level of resource consumption of the selected washing program;
   allowing a user to operate the user interface to change the duration of the selected washing program from a first duration to a second duration to adjust the degree of ecological impact, wherein the washing appliance adapts the selected cleaning program to comply with the changed duration, such that the selected washing program with the second duration achieves a degree of cleanness equal to the selected washing program with the first duration;
   displaying, on the user interface, the degree of ecological impact caused by the selected washing program when complying with the changed duration; and
   controlling the washing appliance to execute the selected cleaning program when complying with the changed duration.

2. The method of claim 1, comprising:
   allowing the user to select a pre-set option affecting a setting of the selected washing program.

3. The method of claim 1, wherein the degree of ecological impact is stipulated by energy and/or water consumption of the washing appliance.

4. The method of claim 1, wherein the user interface comprises a touch-screen interface and the user is allowed to change the duration of the selected washing program by operating a slider on the touch-screen interface in a left-hand direction for decreased program duration and in a right-hand direction for increased program duration.

5. The method of claim 1, wherein the user is allowed to operate the user interface remotely via a wireless communication device.

6. A computer program comprising computer-executable instructions configured to cause a device to perform steps recited in claim 1 when the computer-executable instructions are executed on a processing unit included in the device.

7. A computer program product comprising a non-transitory computer readable medium, the non-transitory computer readable medium having the computer program according to claim 6 embodied thereon.

8. A washing appliance being configured to be controlled by a user, the washing appliance comprising:
   a user interface being configured to receive user instructions for controlling operation of the washing appliance;

a processing unit being configured to be communicatively connected to the user interface;

wherein the user interface is configured to:
- display an estimated duration of a selected washing program for the washing appliance;
- display, separately from the displayed estimated duration of the selected washing program, a degree of ecological impact caused by the selected washing program, wherein the degree of ecological impact indicates a level of resource consumption of the selected washing program;
- allowing a user to operate the user interface to change the duration of the selected washing program from a first duration to a second duration to adjust the degree of ecological impact, wherein the processing unit is configured to:
- adapt the selected cleaning program of the washing appliance to comply with the changed duration, such that the selected washing program with the second duration achieves a degree of cleanness equal to the selected washing program with the first duration,
- control the washing appliance to execute the selected cleaning program when complying with the changed duration; and the user interface further being configured to:
- display the degree of ecological impact caused by the adapted selected washing program.

9. The washing appliance of claim 8, the user interface further being configured to:
- allow the user to select a pre-set option affecting a setting of the selected washing program.

10. The washing appliance of claim 8, wherein the degree of ecological impact is stipulated by energy and/or water consumption of the washing appliance.

11. The washing appliance of claim 8, the user interface comprising a touch-screen interface comprising:
- a slider configured to be movable by the user in a left-hand direction for decreased program duration and in a right-hand direction for increased program duration.

12. The washing appliance of claim 8, the user interface being configured to be remotely operated by the user via a wireless communication device.

13. The washing appliance of claim 8, said appliance being a dish washer or a washing machine.

* * * * *